UNITED STATES PATENT OFFICE.

DU BOIS D. PARMELEE, OF NEW YORK, N. Y., ASSIGNOR TO JOHN A. GREENE, OF BEVERLY MASSACHUSETTS.

IMPROVEMENT IN MODES OF UNITING SOLID SUBSTANCES.

Specification forming part of Letters Patent No. 25,040, dated August 9, 1859.

*To all whom it may concern:*

Be it known that I, DU BOIS D. PARMELEE, of the city, county, and State of New York, have invented a new and useful Improvement in the Manner of Uniting Various Solid Bodies of the Same or Different Character or Properties; and I do hereby declare that the following is a full, clear, and exact description of the same.

Whenever it is necessary for practical purposes in a permanent manner to unite or join together two or more bodies the simplest, easiest, and cheapest plan would be to make the bodies adhere together by means of glue, cement, or other composition possessing a sufficient degree of coherence, and as it is of very great practical importance that a connection thus formed should not only be strong, but durable, different compositions, as well as various processes, have heretofore been employed in order to obtain a connection of such nature as that the influence of air, moisture, heat, or other agents to the action of which it may be exposed should not deteriorate the cement; but, nevertheless, the use of cements is quite limited. They are used only either for uniting parts of solid or massive structures, or they are used for such articles which are not exposed to the strains of tension or torsion. In many other applications to the arts and manufactures it would be equally advantageous to make use of cements for uniting various parts together were it not rendered practically impossible on account of the bodies thus united together being afterward exposed to considerable strain, created either by the influence of moisture or by great changes in the temperature. These objections hold good in all cases where the bodies are subjected either to lateral strain and tension or to flexion and torsion caused by the action of some mechanical force or power. The reason of this is that all the glues, cements, &c., which are now in use, if possessing a sufficient degree of coherence to make the bodies adhere rigidly and strongly together, are quite void of the necessary degree of elasticity to compensate for the expansion or contraction of the bodies. Thus when the fibers of such bodies either contract or expand, the cement not being able to be effected thereby, in the same way without losing its coherence, the consequence is that the cement will break and allow the bodies to separate.

To obviate these defects is the object of my invention, which consists in making the surfaces adhere together by such means and in such manner as that the cement uniting the two surfaces will not only be impermeable to moisture and not easily affected or deteriorated by other agents, but possess the requisite degree of coherence, coupled with great elasticity, so as to form a perfect joint, affording the means of compensation for the expansions and contractions of the fibers of the bodies; and the nature of my invention consists in the production of a novel cement, being of a permanent and elastic nature, for uniting various solid bodies of the same or different properties—such as wood with wood, metal with wood or leather, and various other substances too numerous to mention—by the interposition between the surfaces of the substances or articles to be united of one or more sheets or layers of india-rubber or gutta-percha, separately or when combined, or when these matters or either of them are combined with other substances, said sheets or layers having been treated previously in such a manner as to create in them the "changing" effect, and applied while such effect is being developed. This is based on the property which I have discovered, that when a sheet of india-rubber or gutta-percha is hermized or vulcanized in the cold way by any of the known processes it passes through a series of changes or transformations before its permanent nature is developed. It first becomes soft, sticky, and plastic, and then gradually acquires more and more consistency and toughness until changed to its permanent character. If such sheets, during the development of the change, be applied between two bodies at their surface to be united, the mass will readily adapt itself to and enter between the fibers of the bodies, and there complete the change and become perfectly hermized or vulcanized. The sheet of rubber not being fully vulcanized at its first interposition between the surfaces to be joined, its plastic and adhesive character is then good to effect a hold, and, if pressure be brought to bear, it will strengthen that capacity, and a most perfect joining takes place until the sheet has "set" or become thoroughly or more perfectly vulcanized, when it will be found to have formed a cement of great tenacity, uniting the two surfaces being joined together in a close and durable manner, constituting a joint much more strong than can be made by ordinary glue in uniting wood with wood, especially where the surfaces to be joined present the end grain, and capable of uniting substances for which glue is unsuitable, or to which it will not adhere; but such are only a few of the advantages of this novel cement. Its toughness when set or vulcanized, freedom from change of condition by change of temperature, water-proof property, and elasticity give it striking advantages over any other known cement. The sheet thus forming the cement may either be thin or thick, according to circumstances, and of as various forms or shapes. Where a fine joint is required it need not be thicker than the thinnest paper. The length of time during which pressure should be applied to perfect the joint must vary according to the thickness or size of the sheet and other circumstances; but the whole treatment from first to last is in ordinary cases a most expeditious one, and the joint of wood with wood, for instance, may be formed in a few minutes. A few seconds of time will be sufficient for the immersion of the sheet in the burnishing solution, and a few minutes sufficient for the after pressure of the bodies being joined together.

I will here only name a few of the purposes to which this cement may be applied with advantage. It may be used for uniting box-wood veneer with cheaper wood to form blocks of the required thickness for the press in wood-engraving, and thus economize the more expensive article of box-wood by only using it as a layer on the top of the block. Ordinary glue or any glue, in fact, does not answer for such purpose, as the surface to be engraved upon must present the end grain of the wood, and the veneer, by varying, as well as by the strain consequent on taking a series of impressions, soon ceases to be properly held by the glue, while screws as a means for fastening for such purpose are equally as objectionable. Such novel cement may also be used with advantage as an intermediate layer between the upper and lower soles of boots and shoes to unite the one sole to the other, and serve at the same time as an intermediate water-proof lining to exclude wet or dampness from the foot, while the preserved porosity of the leather makes the interposed sheet or cement in no wise injurious to health. It may also be used as a cement with like advantages as regards excluding wet or damp to the backs of books in binding by using it to unite the outer with the inner cover of the back. It may also be used in an effective manner to unite the metallic couplings of fire-engine and other hose with the hose itself, and thus meet a long-existing want.

To enable others skilled in the art to use my invention, I will now proceed to give a detailed description of the same; and for the sake of illustration I will first describe the plan adopted by me for veneering or for making wood blocks for engraving, &c.

I take a block of box-wood of the usual dimension for engravings—say one inch in thickness—and saw it into five veneers two-tenths of an inch each. These veneers are made to adhere permanently onto maple blocks of eight-tenths of an inch in thickness in the following manner: A thin sheet of india-rubber is immersed into a solution of bisulphuret of carbon or other suitable solvent, in combination with a chloride or bromide—say forty parts of bisulphuret of carbon to one part of chloride of sulphur—and placed flat on the surface of the maple block, and the whole covered immediately with a box-wood veneer and placed under a press. The india-rubber, by the action of the solvent (bisulphuret of carbon) in the solution, becomes so soft that on being placed under the press it is sufficiently plastic to adapt itself and enter the fibers of the wood. The changing agent, (chloride of sulphur,) in the meantime acting upon the rubber, renders it after a short lapse of time completely vulcanized or hermized, thus giving to it the necessary degree of rigidity and coherence without impairing its elasticity. Another plan of effecting the same object consists in dissolving caoutchouc in bisulphuret of carbon or other solvent, and, when required for use, to mix with it a proportional quantity of a chloride or bromide, and spread the mixture immediately or while fresh by means of a brush or any other convenient means on the surfaces to be joined. They (the surfaces) are then to be brought together and subjected to pressure.

In some cases it may be advisable and more practicable to cover the surfaces to be united with a coating of india-rubber by applying it by means of a brush, it (the rubber) having been for this purpose dissolved in any proper solvent, and then, when it is required to join the surfaces together, it is only necessary to saturate the india-rubber surfaces with the solution of a chloride or bromide mixed with a solvent, as above described.

The same plan of proceeding as hereinabove described for forming engraver's blocks may be applied for joining the surfaces of any kind of bodies or materials; but when the articles to be joined contain oil or grease, or if they be intended for uses which will bring them in contact with oily or fatty substances, it is preferable, instead of india-rubber, to use gutta-percha, which can be applied in precisely the same manner as caoutchouc. In all cases, when one of the bodies to be joined is a metal it is advisable to corrode its surface; but it should invariably be well washed and cleansed and perfectly dried before use.

In preparing the solution, instead of bisulphuret of carbon, naphtha, chloroform, sulphuric ether, or other suitable solvent may be employed, and the solvent, instead of being mixed with one of the chlorides, bromides, &c., may be saturated sufficiently with chlorine gas or vapors of bromide, &c.

Having thus described my invention, what I claim as new, and desire to secure by Letters Patent, is—

The method and process herein described of uniting various substances or bodies of the same or different character and properties by the interposition between the surfaces of said substances or bodies to be united of one or more sheets or layers of india-rubber and gutta-percha, separately or when combined, or when either of them is combined with other substances, such sheets or layers having previously been treated in the manner described to produce the change specified herein, whereby on completion of said change a water-proof cement is obtained, which, while it possesses the requisite rigidity and coherence to keep the bodies firmly and strongly united, possesses a sufficient degree of elasticity to compensate for the expansion or contraction of the fibers of the bodies, for the purposes substantially as set forth.

In testimony whereof I have signed my name to this specification before two subscribing witnesses.

Executed on this 16th day of February, 1859.

DU BOIS D. PARMELEE.

Witnesses:
  A. POLLOK,
  JOHN I. BAKER.